US008126804B2

(12) United States Patent
Huang et al.

(10) Patent No.: US 8,126,804 B2
(45) Date of Patent: Feb. 28, 2012

(54) DECISION SUPPORT SYSTEMS AND METHODS FOR COMPLEX NETWORKS

(75) Inventors: Zhenyu Huang, Richland, WA (US);
Pak Chung Wong, Richland, WA (US);
Jian Ma, Richland, WA (US); Patrick S Mackey, Richland, WA (US); Yousu Chen, Richland, WA (US); Kevin P Schneider, Seattle, WA (US)

(73) Assignee: Battelle Memorial Institute, Richland, WA (US)

( * ) Notice: Subject to any disclaimer, the term of this patent is extended or adjusted under 35 U.S.C. 154(b) by 380 days.

(21) Appl. No.: 12/409,103

(22) Filed: Mar. 23, 2009

(65) Prior Publication Data
US 2010/0241608 A1    Sep. 23, 2010

(51) Int. Cl.
*G06Q 40/00* (2012.01)
(52) U.S. Cl. .............................. 705/38; 705/36; 705/39
(58) Field of Classification Search ................. 705/38, 705/15–45; 706/52
See application file for complete search history.

(56) References Cited

U.S. PATENT DOCUMENTS

| | | | | |
|---|---|---|---|---|
| 7,660,649 | B1 * | 2/2010 | Hope et al. .................. | 700/295 |
| 2010/0100250 | A1 * | 4/2010 | Budhraja et al. .............. | 700/291 |

OTHER PUBLICATIONS

"Visualization and Human Factors in Electric Power System", Sushil Kumar Soonee, Devendra Kuma, Samir Chandra Saxena, Sunil Kumar, Dept. of Electrical Engineering, ITBHU, 2006, 1-2 pg.*

Huang, Zhenyu (Henry), "Next-Generation Control Centers with High Performance Computing", IEEE PES General Meeting, Pittsburgh, PA, Jul. 2008, 16 pages, Pacific Northwest National Laboratory, USA.
Wong, Pak Chung, et al., "Have Green—A Visual Analytics Framework for Large Semantic Graphs", IEEE Symposium on Visual Analytics Science and Technology, 67-74 pps., Oct. 31-Nov. 2, 2006, Baltimore, MD, USA.
Sun, Yan, et al., "Visualizations for Power System Contingency Analysis Data", IEEE Transactions on Power Systems, Nov. 2004, 1859-1866 pps., vol. 19, No. 4, Urbana, IL, USA.
Klump, Ray, Ph.D., et al., "Visualizing Real-Time Security Threats Using Hybrid SCADA/PMU Measurement Displays", Proceedings of the 38th Hawaii International Conference on System Sciences, 2005, 1-3 pps., IEEE.
Soone, Sushil Kumar, et al., "Visualization and Human Factors in Electric Power System Operation", Dept. of Electrical Engineering, ITBHU, 2006, 1-2 pps.

* cited by examiner

*Primary Examiner* — Ella Colbert
*Assistant Examiner* — Hai Tran
(74) *Attorney, Agent, or Firm* — Allan C. Tuan

(57) ABSTRACT

Methods and systems for automated decision support in analyzing operation data from a complex network. Embodiments of the present invention utilize these algorithms and techniques not only to characterize the past and present condition of a complex network, but also to predict future conditions to help operators anticipate deteriorating and/or problem situations. In particular, embodiments of the present invention characterize network conditions from operation data using a state estimator. Contingency scenarios can then be generated based on those network conditions. For at least a portion of all of the contingency scenarios, risk indices are determined that describe the potential impact of each of those scenarios. Contingency scenarios with risk indices are presented visually as graphical representations in the context of a visual representation of the complex network. Analysis of the historical risk indices based on the graphical representations can then provide trends that allow for prediction of future network conditions.

15 Claims, 10 Drawing Sheets

DECISION SUPPORT SYSTEMS AND METHODS FOR COMPLEX NETWORKS

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Complex networks play a critical role in modern societies. Electric power grids, gas pipeline systems, telecommunications systems, and aviation networks are but a few examples. A failure in even a portion of such networks can result in massive economic losses and/or significant disruption to peoples' lives, as well as to industrial, commercial and/or government activities. Operation of these complex networks can be an extremely challenging task due to their complex structures, wide geographical coverage, and sophisticated data/information technology systems. Many of the networks also exhibit highly dynamic and non-linear behaviors, with numerous network configurations. Furthermore, they can be affected by a number of external factors, including, but not limited to, physical attack, cyber threat, human error, and natural disasters. Typically, very little of the complex network operation is fully automated and human-in-the-loop operation is essential. In many instances it would not be uncommon for human operators to examine thousands of possible configurations in near real time to choose the best option and operate the network effectively. Given the lack of automation, network operation has to be largely based on operator experience, with very limited real-time decision support. Inability to process the large amounts of data and to manage the complexity can result in an inability to recognize, anticipate, and respond when situations arise that may lead to network failures. Therefore, there is a need for methods and systems of processing large amounts of operation data in order to transform such data into actionable information.

SUMMARY

The present invention utilizes processor-implemented algorithms and visual analytic techniques to enhance the processing of large amounts of operation data in order to provide decision support for human operators of complex networks. Embodiments of the present invention utilize these algorithms and techniques not only to characterize the past and present condition of a complex network, but also to predict future conditions to help operators anticipate deteriorating and/or problem situations. In particular, embodiments of the present invention characterize network conditions from operation data using a state estimator. Contingency scenarios can then be generated based on those network conditions. For at least a portion of all of the contingency scenarios, risk indices are determined that describe the potential impact of each of those scenarios. Contingency scenarios with risk indices are presented visually as graphical representations in the context of a visual representation of the complex network. Analysis of the historical risk indices, based on the graphical representations, can then provide trends that allow for prediction of future network conditions.

Operation data as used herein can refer to data from a complex network concerning the state, the health, or the conditions in, of, and around the network. For example, in an electric power grid, operation data can comprise telemetered data from the supervisory control and data acquisition (SCADA) system and contingency scenarios. Contingency scenarios can comprise the output of a processor-implemented contingency analysis algorithm and are used to identify operation violations if one or more network elements fail.

In preferred embodiments, risk indices are generated for those contingency scenarios that fail an "N-1" reliability standard. The N-1 reliability standard refers to complex networks that remain stable even after the loss of any single element in the network.

The risk index as used herein is a calculated value that quantifies the risk for failure of a particular network element in a particular contingency scenario. In preferred embodiments, risk indices can be associated with visual representations such as colors and/or elevations in a contour map.

In another preferred embodiment, the representation of the network further comprises a visual presentation of an impact area, which corresponds to a potentially affected region in the network. Intuitively, higher risk levels and risks in dense areas would have larger impacts. Therefore, in one embodiment the risk level is proportional to an impact area and equal risk index values will have the same impact area values representing a particular radius or region in the network. In a preferred embodiment, impact areas are represented by contours on the visual representation on the network. Accordingly, in one example a network element at high risk for failure will have a high risk index and a relatively large impact area. That network element can be represented by a particular color denoting the relatively high risk index and by a relatively large elevated region (i.e., height and breadth) on a contour map of the network denoting a large impact area.

One example of a representation of the network is a map. The map can represent a physical region in which the network resides and can show the location and connectivity of network elements. The risk index, as used herein, is a calculated value that quantifies the risk for failure of a particular network element in a particular contingency scenario. Visually presenting can comprise presenting a plurality of contingency scenarios superimposed over one another.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Figure 1:
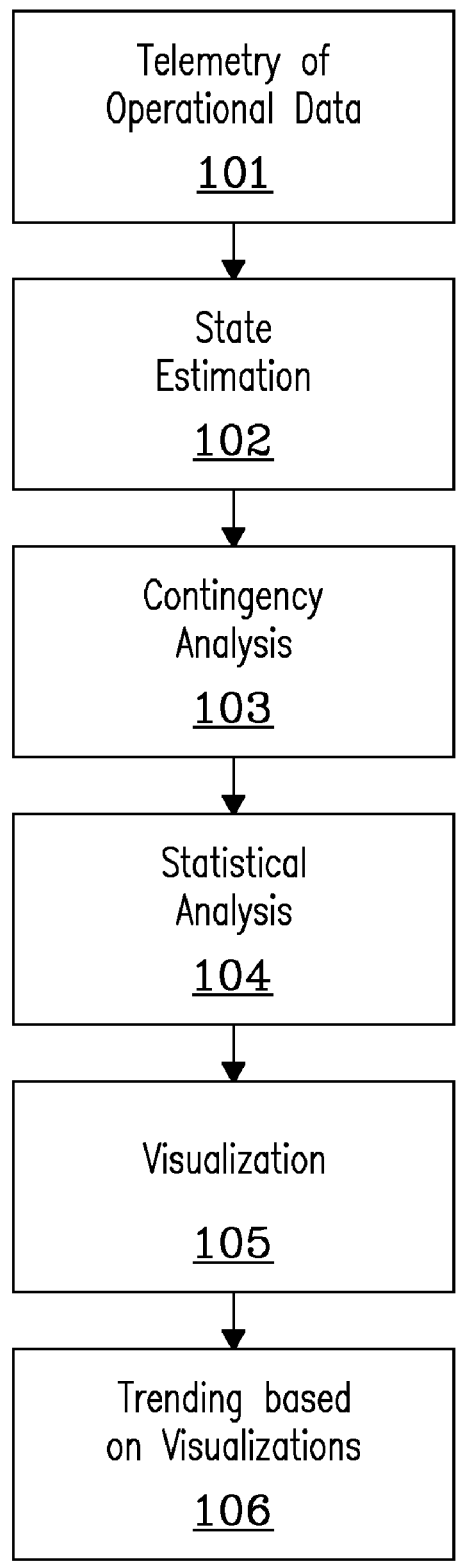
FIG. 1 is a block diagram depicting the functional structure for decision support in a complex network according to one embodiment of the present invention.

FIGS. 1-11 show a variety of aspects and embodiments of the present invention. FIG. 1 depicts a functional structure for complex network operation according to one embodiment of the present invention. The state estimator 102 typically receives telemetered operation data 101 from, for example, a supervisory control and data acquisition (SCADA) system every few seconds. The state estimator can comprise a processing device programmed to extrapolate a full set of network conditions for operators based on the current network configuration and a theoretically based model of the network. Various state estimation algorithms and models exist and are suitable for implementation in the present invention. The output of the state estimator drives other operation functions including contingency analysis 103. Contingency Analysis generates "what-if" conditions and scenarios in anticipation of potential network failures. Contingency Analysis can identify operation violations in contingency scenarios if one or more elements in the network fail.

Contingency Analysis can be continually run at particular intervals, which commonly range from seconds to minutes to anticipate the possibility and effect of equipment failures. If the loss of one or more elements does not result in any limit violations, then the system is said to be secure for that contingency. The contingencies that do result in violations of operating limits can be flagged and reserved for an operator to inspect and/or for further analysis. It is not uncommon for several hundred contingencies to be examined making conveying the contingency scenarios to system operators in a meaningful and easy-to-understand way a fundamental challenge, especially for existing state-of-the-art decision support systems.

In one example, because of the size of modern power grids, the number of contingencies to be studied can be prohibitively large. The western U.S. high-voltage power grid alone has about 20,000 elements. Failure of any one element, i.e. N-1 contingencies, would constitute 20,000 contingency cases. "N-2" contingencies would be in the order of $10^8$. Actual grid failures such as blackouts often involve the failure of multiple elements (N-x contingencies).

Referring still to FIG. 1, embodiments of the present invention include additional statistical and analytical tools 104 to analyze the data and extract useful and necessary information for network operators. The additional tools are based on visualizations 105 of the contingency scenario data and provide historical and predictive trending analysis 106 derived from such visualizations. In a preferred embodiment, network trends are derived from graphical representations in and/or from the visualizations and not from the contingency scenarios directly or statistical analysis of the contingency scenarios. Accordingly, the operators will be visually presented with actionable information of the current status and network trends rather than merely massive amounts of data.

In the following examples, the complex network is embodied as a power grid. The decision support system receives telemetered operational data from a SCADA system. State estimation and contingency analysis are performed on computing devices executing suitable algorithms to generate and output contingency scenarios. Although the examples below are presented in the context of a power grid as the complex network, the decision support system can be extended to other industries and applications. Examples include gas pipeline systems, telecommunication systems, aviation systems, air traffic control, computing networks, and other complex networks.

EXAMPLE

Decision Support in a Power Grid Network

In the context of contingency scenarios, contingency violations can refer to situations in which operation parameters (e.g., power on a line or voltage at a substation) exceed their limits according to predefined thresholds. For example, the power that a transmission line can transfer has a limit due to thermal and/or stability constraints. Exceeding the limits will result in equipment failure and/or system instability. Thus, the risk index of a transmission line can be defined as the relative loading R % with respect to the limit $P_{max}$, as follows where "ik" denotes the ith transmission line of the kth contingency scenario.

$$R_{ik}\ \% = \frac{P_{ik}}{P_{imax}} \times 100\% \qquad \text{Eqn. 1}$$

Similarly, for example, the risk of a substation can be characterized similarly with the primary difference being that the substation voltage can have both lower and upper limits ($V_{min}$ and $V_{max}$). The risk index for substations can be defined as follows, where "ik" denotes the ith substation of the kth contingency.

$$R_{ik}\% = \left|\frac{(V_{ik} - V_{imin}) - (V_{imax} - V_{imin})/2}{(V_{imax} - V_{imin})/2}\right| \times 100\% \quad \text{Eqn. 2}$$

In preferred embodiments risk indices can be categorized to simplify analyses. Accordingly, in the instant example, for each power grid contingency k, the risk of lines and substations can be categorized as follows, where $R_T\%$ is the pre-specified alert risk level.

$$R_{ik}\% \in \begin{cases} [0, R_T\%), & \text{safe} \\ [R_T\%, 100\%), & \text{alert} \\ [100\%, \infty), & \text{violation} \end{cases} \quad \text{Eqn. 3}$$

Compared with a tabular presentation of data, which is commonly used in the prior art, the embodiments described above can convert the contingency data into quantitative risk levels, which indicate severity if an operation parameter exceeds its limit. This conversion also goes beyond the violation data. Risk levels can define how close the operation parameter is to the limit, even if there are no violations, as shown in Eqn. 3.

In addition to defining the risk levels of elements (i.e., transmission lines, substations, etc.) for each contingency scenario, the collective risk level of an element can be defined statistically as the max, sum or mean of the risk levels of the element across all the contingency scenarios. For example, each contingency scenario will generate a set of risk levels as defined in Eqns. 1-3. If a total of K contingencies are analyzed, there will be K sets of risk levels. Across all the contingencies, the risk level of the ith element can be defined, for example, as max as is shown below.

$$R_i\% = \max(R_{ik}\%), k=1,2,\ldots,K \quad \text{Eqn. 4}$$

Embodiments of the present invention further define risk levels for the whole network and for regions of interest and present those risks through novel visualizations. For example, failure of one element in a power grid would almost certainly propagate into other areas of the grid. Given the different geographic locations of transmission lines and substations, and given the heterogeneous structure of a power grid, such propagations would be different in different regions of the network. In other words, a particular risk level determined for different lines and/or substations can have substantially different levels of impact to the power grid. Intuitively, higher risk levels and network components in dense areas would have larger impact. Accordingly, in one embodiment a each risk level value would propagate into a particular radius of a geographic area, which is determined using visual analytics techniques. The result of this application is a contoured map with the color indicating the impact of the risk levels. Then it is very easy for operators to see the vulnerable areas of the grids without the need to sift through individual numbers.

Figure 2:
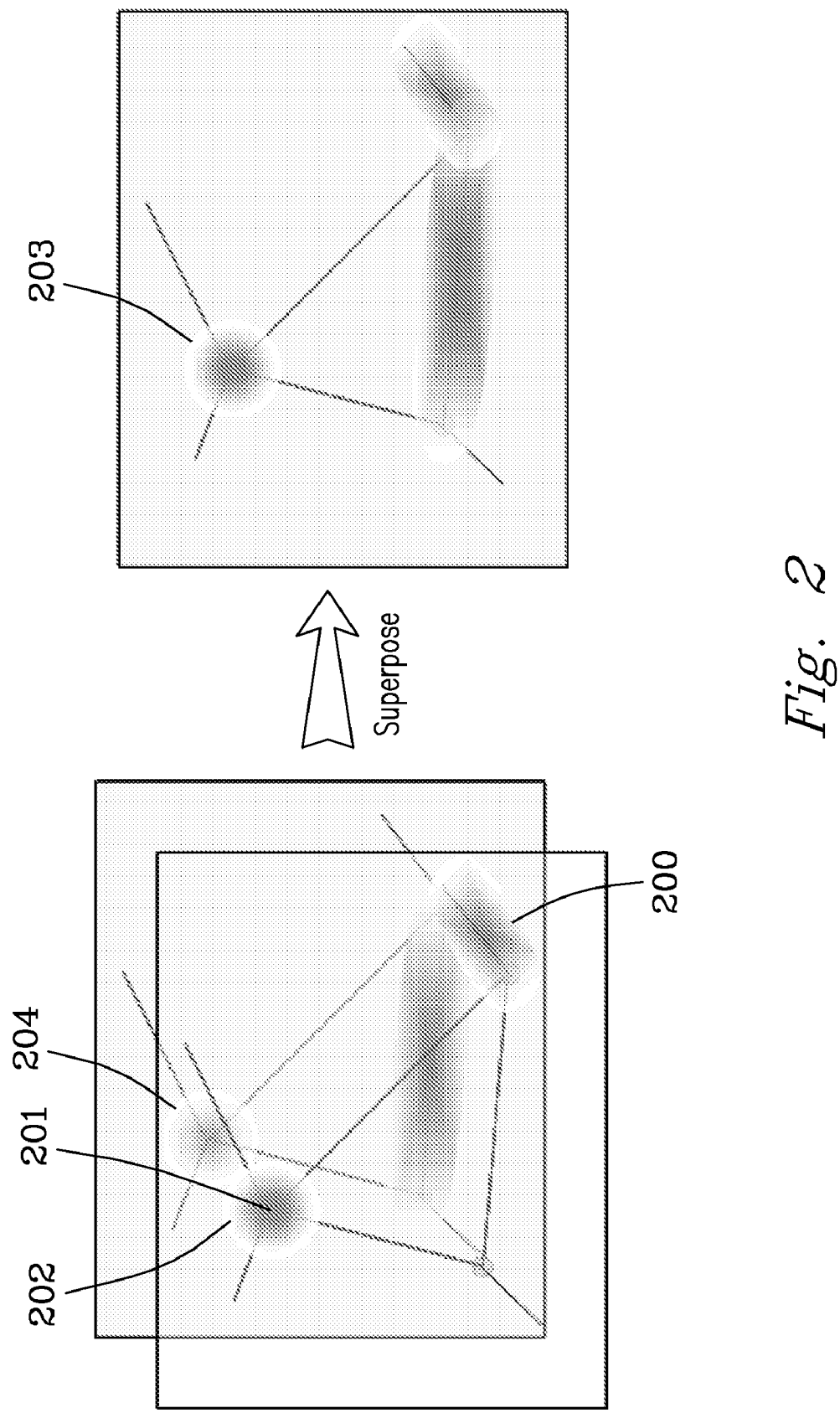
FIG. 2 is an example of visual representations of impact areas for potentially failing network elements according to one embodiment of the present invention.

In a specific example, lines and substations are assigned risk levels on a geographical map of the power grid as described elsewhere herein. The propagation is visualized as fading colors originating at a central point 201 as shown in FIG. 2. The impact area 202 of a substation has a circular shape, while a transmission line 200 has an elliptical shape. Individual risk impact areas (202, 204) are then superposed to form the collective impact areas 203. The same superposition is done among multiple contingencies as well. Colors and impact-area shapes can be suitably assigned according to the particular application, and are not limited to circles and ellipses.

Figure 3:
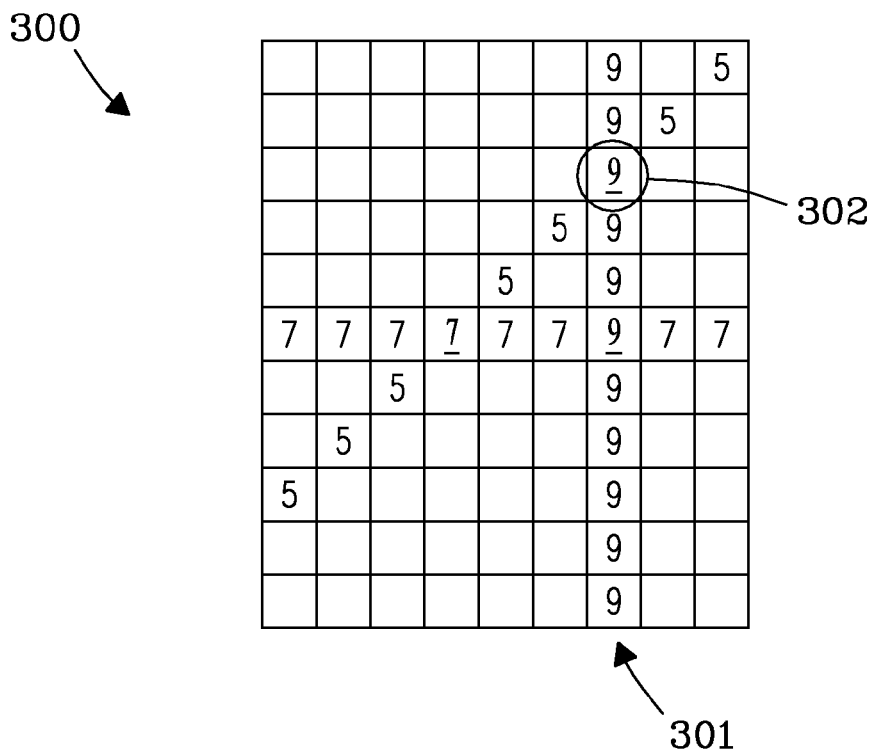
FIG. 3 is an exemplary hash table for determining risk levels and/or impact areas of overlapping regions.
Figure 4:
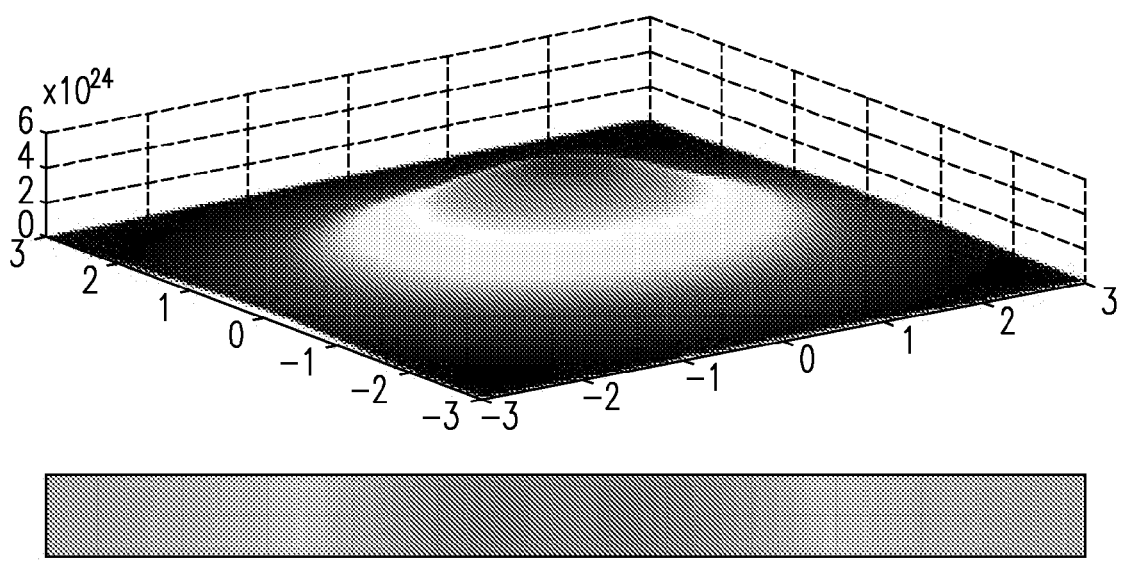
FIG. 4 is an exemplary visualization of a color contour of an impact area denoting risk levels.

Referring to FIG. 3, superposition of visually depicted impact areas can be achieved using a hash table 300 to store all the pixels of the lines and substations. Each pixel has a value determined by the risk level of the line 301 or substation. When lines are crossing 302, the larger value remains in the table so the highest risk is represented.

The impact areas can further be represented in a visualization by colors that denote risk levels. For example, referring to FIG. 4, a filter can be circularly shaped with values conforming to that of a Gaussian curve. The Gaussian curve is normalized so that the peak height is equal to one. The radius of the filter is a parameter settable by the user. In the present example, the Gaussian curve is defined to have three standard deviations within one radius. At each of the pixel points associated with the lines and substations stored in the hash table, the value in the table is multiplied by the Gaussian curve. These products are then added to an output graphic matrix representing the final contour. The outcome of the Gaussian filtering is the output matrix defining each point in the map with a floating point number. These floating point numbers are then mapped to a color map to obtain the final contour. In order for it to be easy to interpret, a green/gray/red color map is selected. Considering the three risk categories defined in Eqn. 3, the color map can be understood as green, gray and red correspond to three risk categories—safe, alert and violation, respectively.

Figure 5:
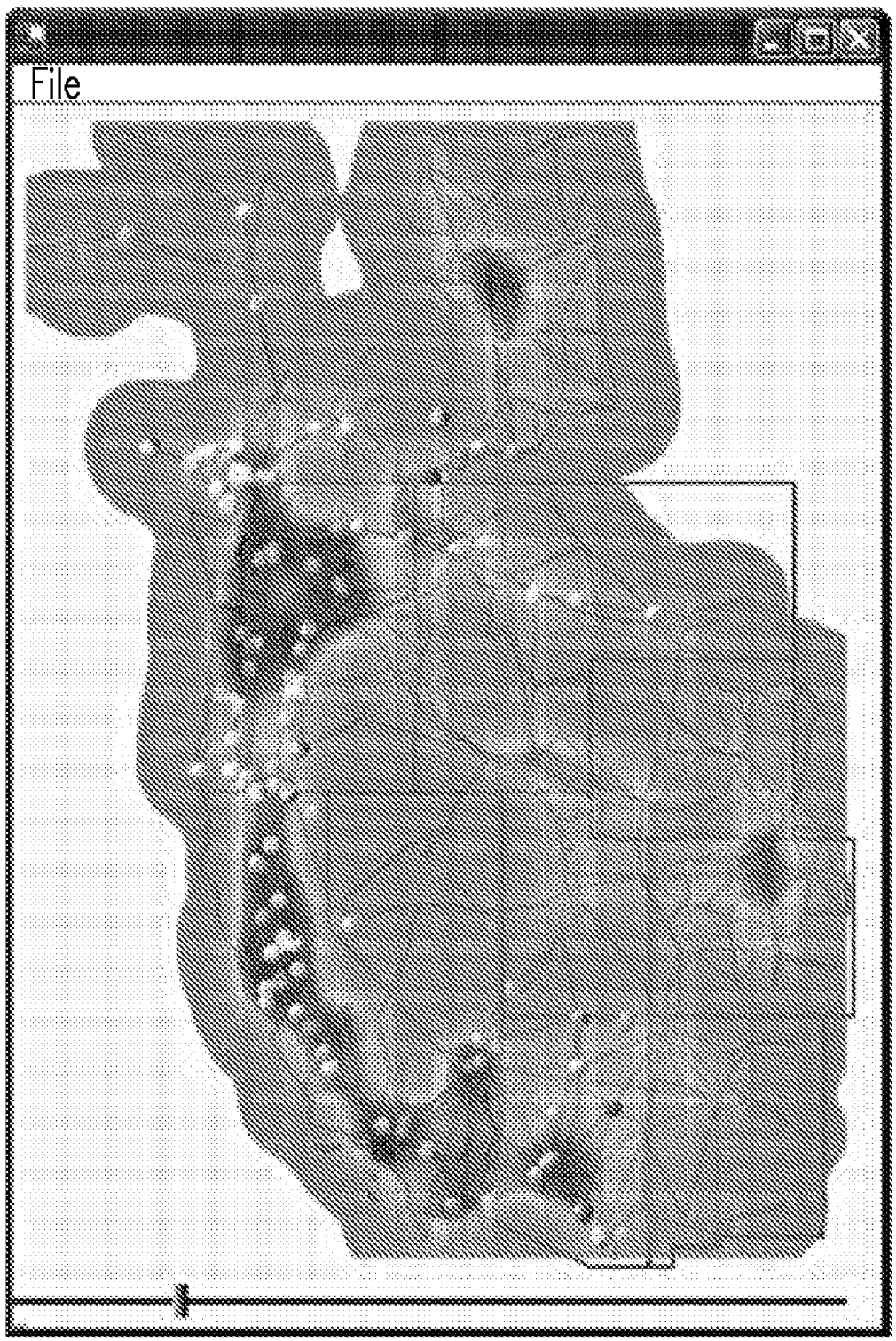
FIG. 5 is a color contoured map displaying a visualization of actual data for a western U.S. power grid, generated according to embodiments of the present invention.

In one embodiment, the final visual representation uses an application framework for large semantic graphs that provides an interface for navigating and zooming over the map of the power grid. The graphics are developed in C# using Managed DirectX. An example of the color contoured map is shown in FIG. 5. This example uses actual model and data of the western U.S. power grid. 200 contingencies are analyzed, and 200 sets of risk levels are overlaid on the single map to visualize the collective impact of the contingencies on the system security. A red color can indicate vulnerable portions of the power grid and brings attention to network operators. Compared with data presented in tabular form, this color contoured map has the obvious advantage of bringing information rather than raw data to operators.

Based on the color contoured map, the overall risk level, R %, of the network can be characterized using a statistical analysis method defined as a combination of arithmetic average and geometric average over all the pixel points on the map. Accordingly, the characterization is based on the visualization as follows, where $a_1$ and $a_2$ are weighting constants. η and γ are the arithmetic average and geometric average, respectively.

$$R\% = a_1\eta + a_2\gamma \quad \text{Eqn. 5}$$

The statistical analysis is performed over all the pixel points on the map. Each pixel has a color value corresponding to the risk level at that pixel. If, for example, all the pixels are categorized into M categories and there are $N_m$ pixels in each category with the same color value $(R\%)_m$, then the arithmetic and geometric averages can be calculated as follows.

$$\eta = \frac{\sum_m (R\%)_m N_m}{\sum_m N_m}, m=1, 2, \ldots, M \quad \text{Eqn. 6}$$

-continued $$\gamma = \left[\prod_m (R\ \%)_m^{N_m}\right]^{\frac{1}{\Sigma_m N_m}}, m = 1, 2, \ldots, M \qquad \text{Eqn. 7}$$

For regional risk levels, an analogous process can be applied but only the pixels in a particular region are considered.

Figure 6:
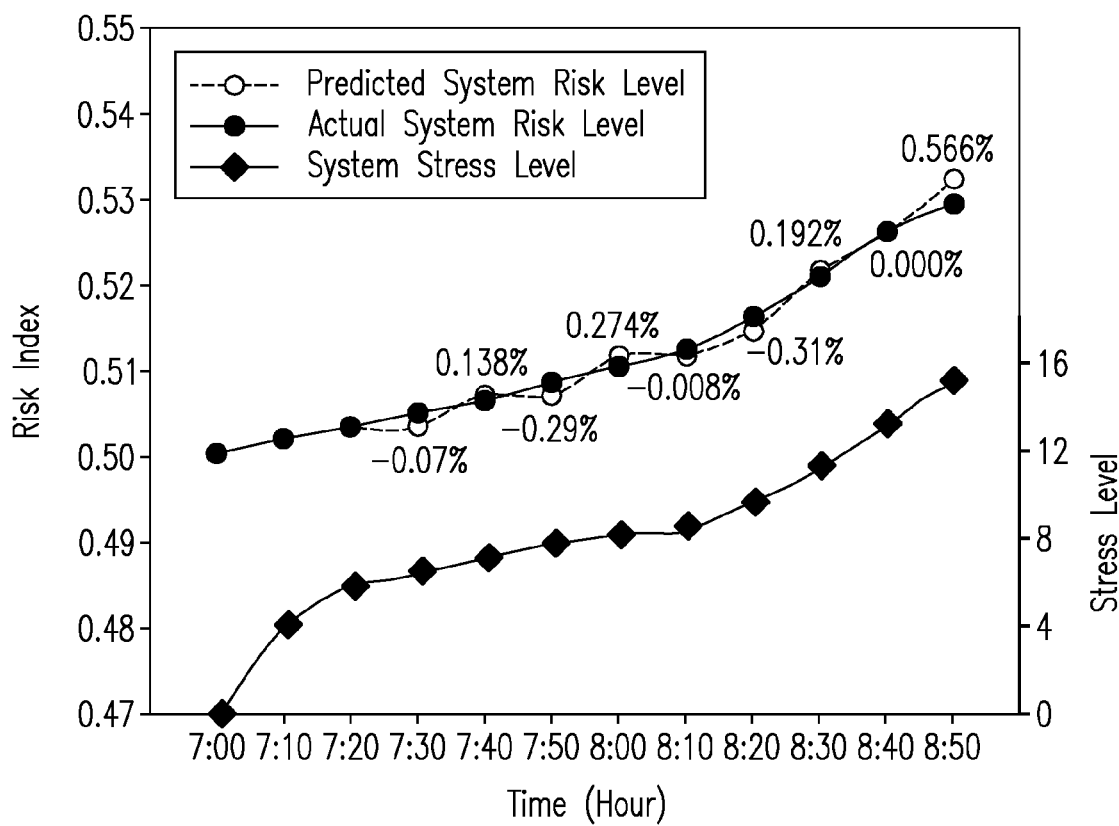
FIG. 6 is a plot of system stress levels as well as predicted and actual system risk levels based on the visualization in FIG. 5.

As an example of the computer-implemented analysis described herein, FIG. 6 shows a plot of the stress levels as well as the predicted and actual risk levels, which were determined according to embodiments of the present invention, of a western U.S. power grid over a morning load pick-up period. When the system total power consumption is at a low level (i.e., the beginning of the period), load increase does not increase risk levels as much as when the total consumption is at a higher level towards the end of the period. This is consistent with operation experience.

While the same statistical analysis can be performed directly from the risk levels calculated from Eqn. 4, the advantage of performing the analysis in the visual space is that the propagation and collective impact areas are considered, which is more reasonable and realistic for actual power grids.

Figure 7:
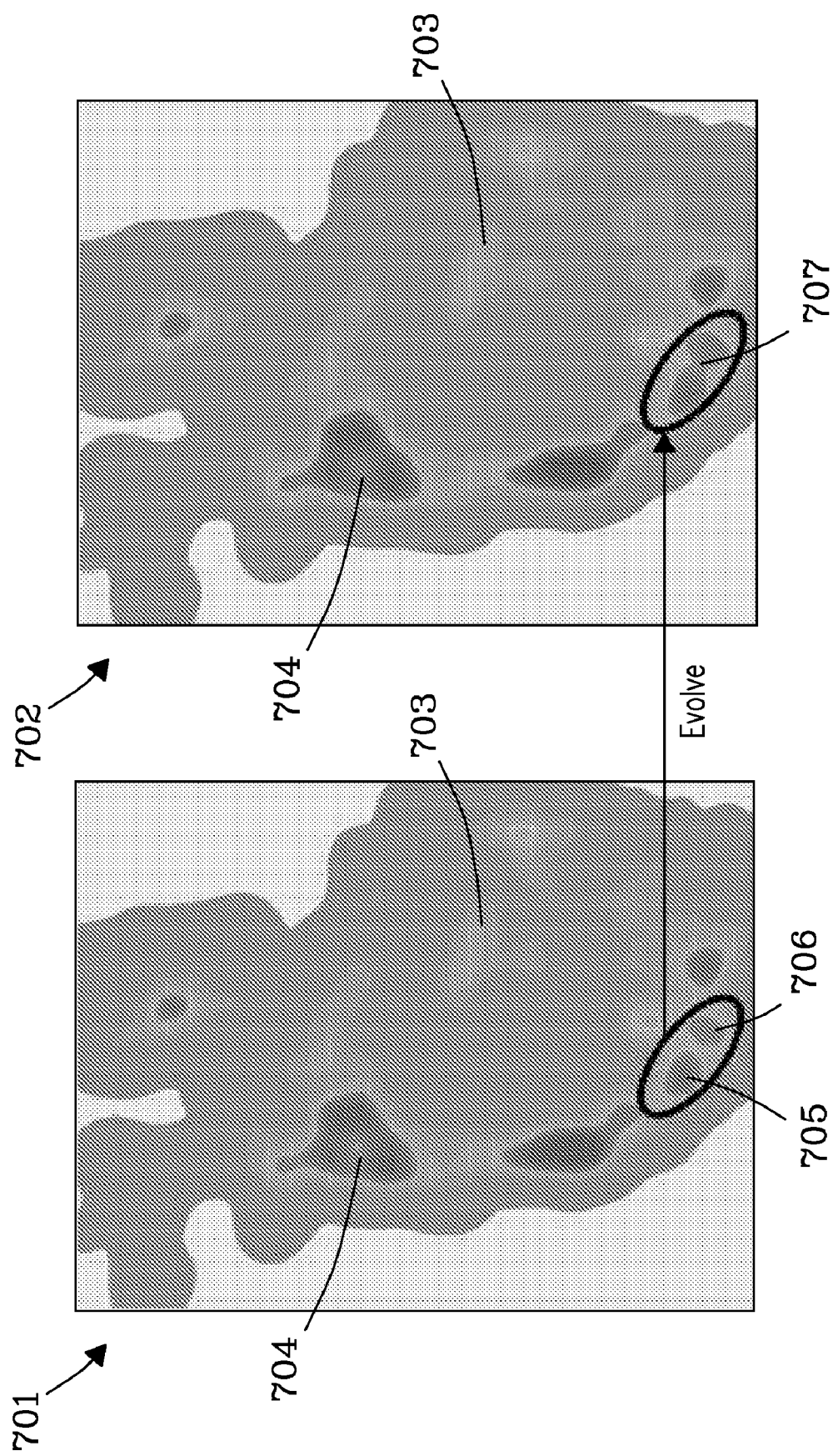
FIG. 7 includes visualizations of the western U.S. power grid risk levels at two points in time depicting evolving patterns in risk levels and impact areas.

In another embodiment, evolving patterns of the visual maps can be observed to determine the trend of network reliability and security. For example, an increase in color intensity and impact area size would indicate a deteriorating network situation and would require operator attention. In a simple network, evolving patterns are simple and cursory examination of the maps may be adequate to determine any trends. However, in a complex network, evolving patterns can be complicated and the number of the patterns can be significant at any given time. FIG. 7 shows two exemplary contour maps 701, 702 from different points in time with several violation areas 704 and several alert areas 703. All areas evolve from one time to the next. An operator may be able to note the pattern of areas 705 and 706 merging into one single area 707. But it is very difficult to determine how the other areas are evolving and how to quantify the evolution. And more importantly, how to use the quantified evolution to determine any trends and/or predict the network status at some time in the future.

Figure 8:
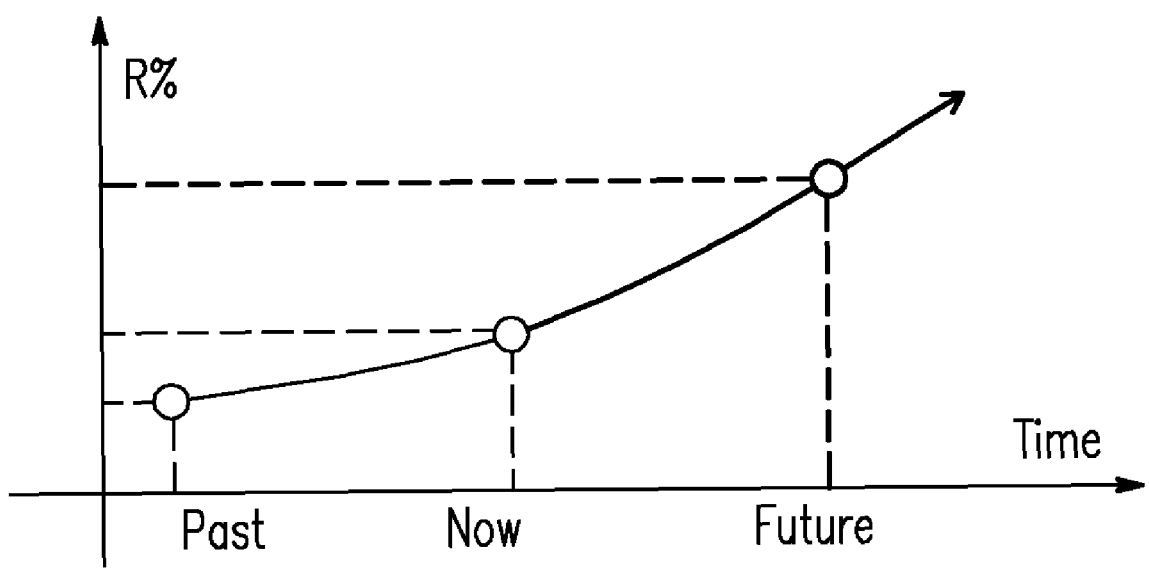
FIG. 8 is a plot depicting an exemplary trend line utilized in and by embodiments of the present invention.

In some embodiments, trending and prediction of network status is based on characterizing changes in the overall and/or regional risk levels as determined by the visualization and by the application of Eqn. 5. In particular, the trend can be obtained by fitting a curve to historical risk levels of the network or regions, and extrapolating to predict future network situations, as shown in FIG. 8.

Figure 9:
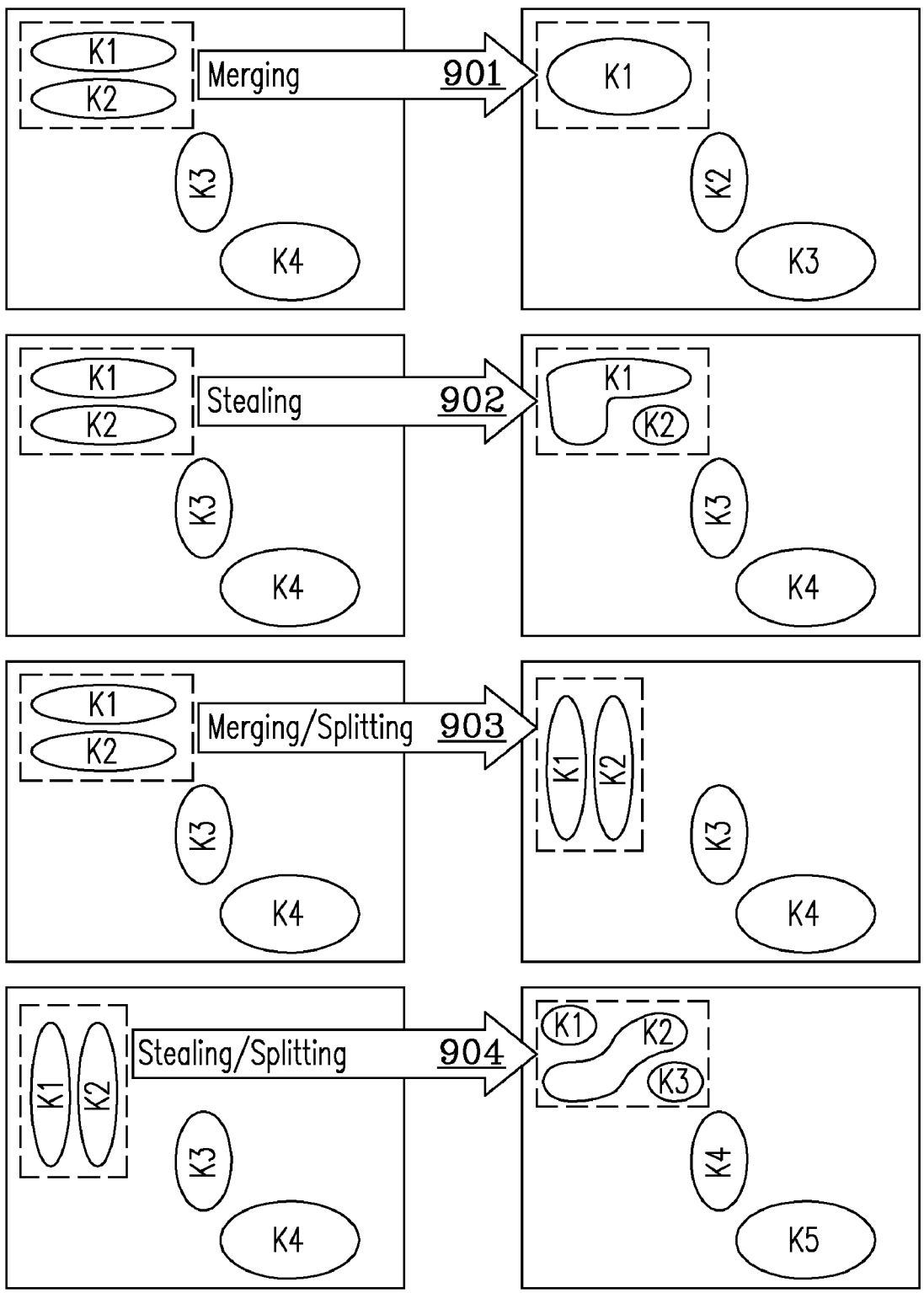
FIG. 9 includes examples of evolving area patterns.

Complex evolving patterns may exist in a network. Referring to FIG. 9, exemplary pattern evolutions are depicted. For example, two areas can "merge" 901 into one. The opposite of a merge can be a single area splitting into multiple areas. Alternatively, one area can "steal" 902 a portion of another area. Combinations of pattern evolutions can also exist such as merging/splitting 903 and stealing/splitting 904.

Figure 10:
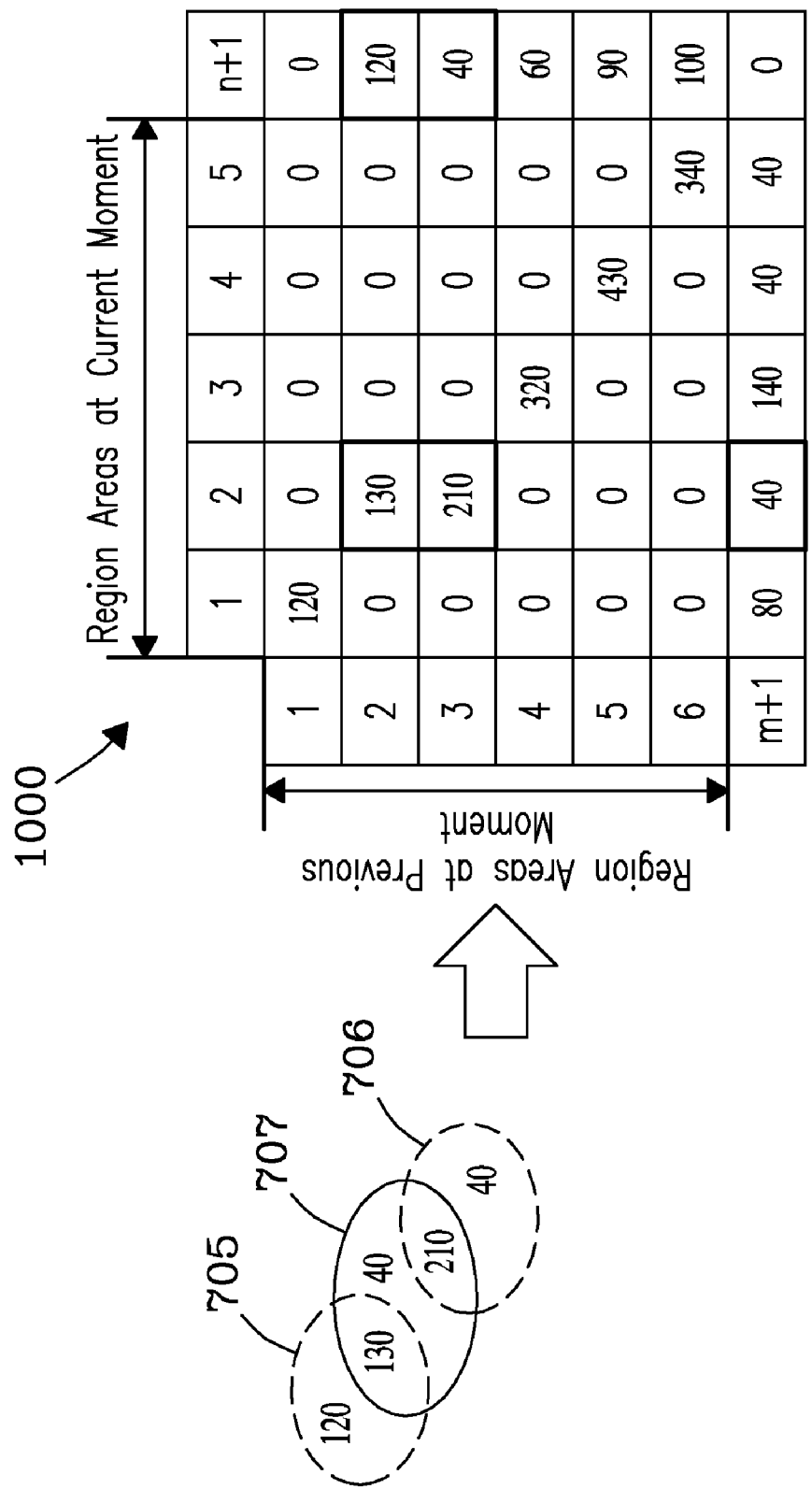
FIG. 10 depicts automated pattern identification using a relation matrix according to embodiments of the present invention.

In one embodiment of the present invention, the decision support system automatically identifies the complex patterns and their evolution. Automatic visual trending analysis can combine structural analysis and statistical analysis, as shown in the illustrated embodiment of FIG. 10. Statistical analysis can be used to calculate risk indices of individual areas as described elsewhere herein, while structural analysis can use a relation matrix 1000 to capture the relationship between areas (i.e. how two areas overlap and differ at the pixel level). The elliptically shaped areas (705, 706, 707) in FIG. 10 represent and correspond to the evolving areas shown in FIG. 7. Accordingly, areas 705 and 706, which exist at a first point in time, merge into area 707 at a second point in time. The values shown inside of areas 705, 706, and 707 are the pixel risk levels determined according to embodiments of the present invention. These values are used to populate the relation matrix 1000. The values in the relation matrix represent the pixel risk levels in overlapping areas. However, the last row and last column are reserved for the pixel risk level values from non-overlapping areas. The instant embodiment has been successful in identifying the complex evolving patterns shown in FIG. 9.

Figure 11:
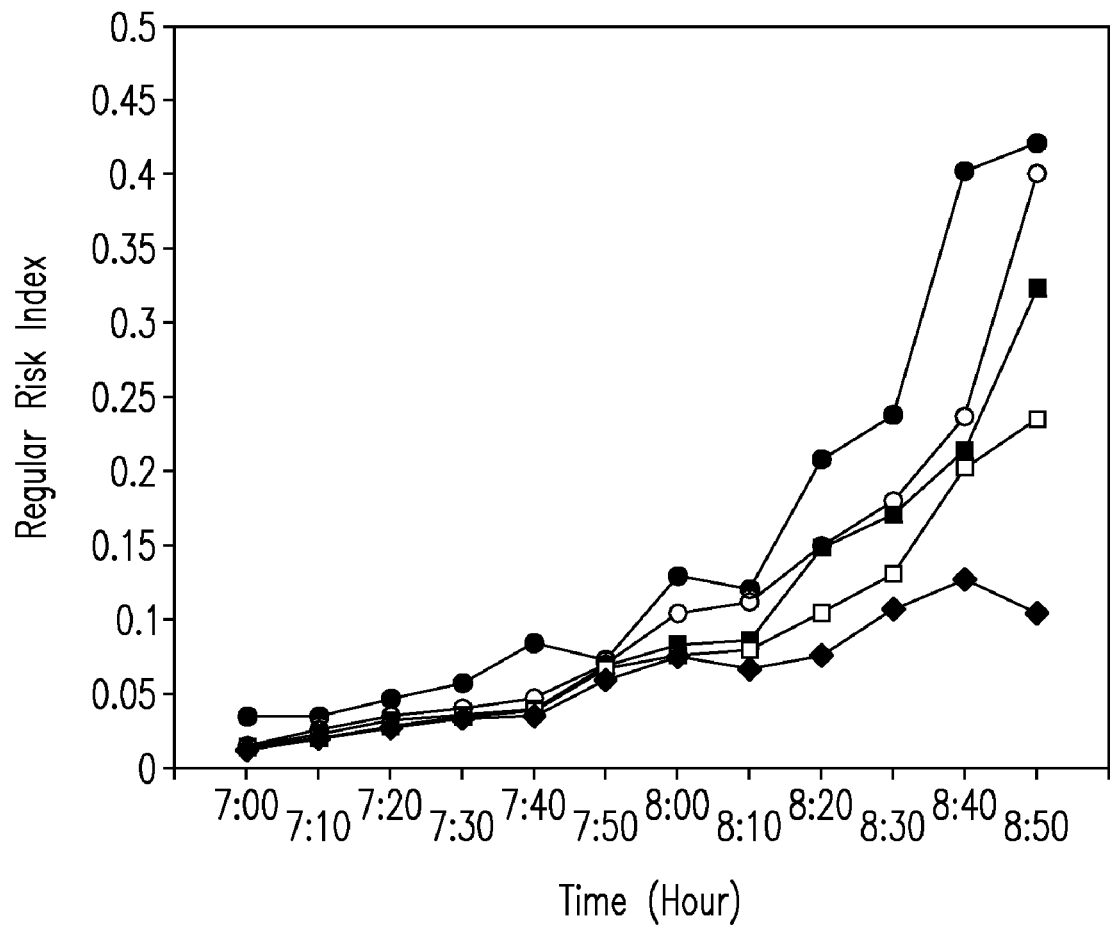
FIG. 11 is a plot of regional risk levels based on the visualization in FIG. 5.

Referring to FIGS. 6 and 11, the visual trend analysis described herein can provide a level of granularity to the risk assessment that allows operators to identify evolving patterns and potential violations that may not show up on a network-wide scale. For example, the dashed line in FIG. 6 is the predicted system risk level. Each predicted point is based on three consecutive historical risk levels. It can be seen that the prediction is reasonably close to the actual system risk level (solid line). FIG. 11 further shows the trends for the five most critical regions in the power grid, corresponding to the same system conditions in FIG. 6. The regional risk trends are generally more radical than the system trend. The system trend is relatively flat as changes in different regions may cancel each other's impact. Therefore it can be important to observe regional trends to recognize potential regional failures. Embodiments of the present invention encompass and facilitate such regional trending.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of analyzing operation data in a decision support system for a complex network, the method comprising:
    Characterizing network conditions from operation data using a state estimator;
    Generating a plurality of contingency scenarios based on the network conditions;
    Determining risk indices for at least a portion of the contingency scenarios;
    Visually presenting the plurality of contingency scenarios superimposed over one another with risk indices as graphical representations in the context of a visual representation of the network; and
    Trending historical risk indices based on their graphical representations to predict future network conditions.

2. The method of claim 1, wherein the complex network comprises an electric power grid.

3. The method of claim 1, wherein said generating contingency scenarios comprises using a processor-implemented contingency analysis algorithm.

4. The method of claim 1, wherein risk indices are generated for contingency scenarios that fail an "N-1" reliability standard, where "N" is the total number of applicable elements in the network.

5. The method of claim 1, wherein each risk index quantifies the risk for failure of a particular network element in a particular contingency scenario.

6. The method of claim 1, further comprising visually presenting an impact area on the representation of the network, the impact area corresponding to a potentially affected region in the network.

7. The method of claim 6, wherein the impact area is represented by contours on the visual representation of the network.

8. The method of claim 1, wherein the representation of the network comprises a map.

9. A decision support system that analyzes operation data from a complex network, the system comprising:

Communications hardware operative to communicate operation data between the support system and the network;

One or more processors each, or collectively, programmed to characterize network conditions from operation data using a state estimator, to generate a plurality of contingency scenarios based on the network conditions, to determine risk indices for at least a portion of the contingency scenarios, to generate a visualization comprising the plurality of contingency scenarios superimposed over one another with the risk indices as graphical representations in the context of a visual representation of the network, and to trend historical risk indices based on their graphical representations to predict future network conditions.

10. The system of claim 9, comprising a plurality of processors configured for parallel computing.

11. The system of claim 9, wherein the complex network comprises an electric power grid.

12. The system of claim 9, wherein each risk index quantifies the risk for failure of a particular network element in a particular contingency scenario.

13. The system of claim 9, wherein the one or more processors are each further programmed to generate a visual representation of an impact area on the visual representation of the network, the impact area corresponding to a potentially affected region in the network.

14. The system of claim 13, wherein the visual representation of the impact area comprises contours on the visual representation of the network.

15. The system of claim 9, wherein the visual representation of the network comprises a map.

* * * * *